United States Patent [19]
Furusawa et al.

[11] Patent Number: 6,070,180
[45] Date of Patent: *May 30, 2000

[54] DIGITAL ARITHMETIC INTEGRATED CIRCUIT

[75] Inventors: Toshiyuki Furusawa, Tokyo-to; Yusei Itaya, Yokohama; Masaru Ozeki, Omiya, all of Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/658,999

[22] Filed: Jun. 4, 1996

[30] Foreign Application Priority Data

Jun. 5, 1995 [JP] Japan ................................. 7-137079

[51] Int. Cl.[7] ..................................................... G06P 7/38
[52] U.S. Cl. ............................................................ 708/490
[58] Field of Search ........................ 364/736.01, 736.02, 364/748.07, 748.09, 748.12, 748.16, 748.19, 749, 754.01, 757, 759, 760.01, 760.02, 760.03, 760.04, 760.05; 708/490, 520, 625, 627

[56] References Cited

U.S. PATENT DOCUMENTS

| | | | |
|---|---|---|---|
| 5,253,195 | 10/1993 | Broker et al. | 364/759 |
| 5,426,600 | 6/1995 | Nakagawa et al. | 364/764 |
| 5,631,859 | 5/1997 | Markstein et al. | 364/748 |

*Primary Examiner*—Chuong Dinh Ngo
*Attorney, Agent, or Firm*—Oblon, Spivak, McClelland, Maier & Neustadt, P.C.

[57] ABSTRACT

A digital signal processor (DSP) of high speed and high precision is disclosed. The DSP (i.e., digital arithmetic integrated circuit) comprises: an arithmetic data storing memory (11) for storing arithmetic data and for outputting, in one instruction cycle, first and second arithmetic data strings each composed of a plurality of bits, the first arithmetic data string being composed of m-bits of at least a predetermined unit wiord length and the second arithmetic data string being composed of (m×n)-bits of a unit word length; two arithmetic operand storing registers (12) for storing the first and second arithmetic data strings outputted by said arithmetic data storing memory, respectively; an arithmetic logical unit for executing arithmetic operation on the basis of the two operands outputted by said arithmetic operand storing registers in one instruction cycle (13); and an arithmetic result storing register (15) for storing the arithmetic results outputted by said arithmetic logical unit.

11 Claims, 8 Drawing Sheets

DIGITAL ARITHMETIC INTEGRATED CIRCUIT

BACKGROUND OF THE INVENTION

1. Field of the Invention

The present invention relates to a digital arithmetic integrated circuit (or a digital signal processor), and more specifically to a digital arithmetic integrated circuit provided with a circuit section for executing arithmetic operation at high speed and at high precision.

2. Description of the Prior Art

With the recent advance of LSIs and signal processing techniques, the digitalization technique of data communications terminals has progressed rapidly. However, in the field of portable data communications apparatus, in particular, a further advance of the technique is still required. For instance, there exist various desires such as solution of the insufficient circuit capacity, reduction of the noise, improvement of the privacy or secrecy, shortening of the speech waiting time, etc. with the spread of the portable data communications apparatus. Accordingly, in the recent portable data communications apparatus, a digital communication processing LSI or a digital signal processor (referred to as DSP, hereinafter) has become indispensable, and a key of the spread of the portable data communications apparatus is dependent upon the higher precision and the higher operation speed of the DSP.

Here, in the digital signal processing by use of the DSP, since the major part of the processing time is occupied by product-addition operations, that is, by accumulative additions of the multiplication results, a great problem with respect to the development of the DSP is how to execute the product-addition operations at a high speed and further at a high arithmetic precision.

On the other hand, when the arithmetic operation speed thereof is improved by increasing the clock frequency, current caused by charge and discharge within the LSI in unit time increases, thus causing an increase of the power consumption thereof. To overcome this problem, therefore, the operation speed thereof has been so far improved by parallel processing (i.e., pipeline processing). In this pipeline processing method, a plurality of processings are executed simultaneously in parallel to each other, so that it is possible to increase the throughput in a unit time without increasing the clock frequency.

A conventional DSP so far adopted will be described hereinbelow with reference to FIG. 7. In the drawing, the DSP is roughly composed of an arithmetic data storing memory 101 for storing arithmetic data (referred to as data, simply), two arithmetic operand registers 102 each for storing an arithmetic operand, a parallel multiplier 103, an arithmetic logical unit 104, and an arithmetic result register 105 for storing operation results obtained by the parallel multiplier 103 and the arithmetic logical unit 104. Here, the parallel multipliers 103 and the arithmetic logical unit 104 are sometime constructed as a same single unit, which is referred to as an accumulative adder 106. Further, the above-mentioned registers 102 and 105 are constructed by a latch circuit or a flip-flop circuit, respectively. Further, in FIG. 7, the numbers of bits of the respective data are also shown, by way of example.

Further, the above-mentioned construction is the same in both the single precision DSP and the double precision DSP. In the case of the double precision DSP, however, since the number of bits of the arithmetic data to be processed is larger than that of the single precision DSP, the capacities of the respective units, the signal lines for data transmission, etc. become inevitably large, Conventionally, when the high speed processing is considered as being important, the single precision DSP is used to execute the single precision operation in fixed-point method. When the operation precision is considered as being important, on the other hand, since a large operational error is inevitably produced in the single precision operation, the operational error must be always taken into account whenever programs are being prepared. However, in the data processing, there exist some cases where the high precision operation is rather essential.

In the conventional single precision DSP for processing data at high precision, the following method has been so far adopted: The ordinary data processing which does not required a high precision is executed at high speed by the single precision operation, and only the data processing which requires a high precision is executed at double precision by use of the single precision DSP.

However, when the above-mentioned method such that the double precision operation is executed by use of the single precision DSP is adopted, the following problems arise: For instance, when the double precision operation is executed by use of the single precision DSP constructed as shown in FIG. 7, the procedure of four cycles as shown in FIG. 8 is required. In more detail, when high-order 16-bit data are denoted by $X_h$ and $Y_H$ and low-order 16-bit data are denoted by $X_L$ and $Y_L$, respectively, four cycles are necessary to execute the multiplication of $(X_H+X_L)\times(Y_H+Y_L)$. In addition, since the reading of the arithmetic data from the memories, the digit position arrangement of the multiplication results, the addition processing for obtaining the final results, etc. are required, a series of about 6 to 8 processing cycles is needed, thus resulting in a long processing time.

Further, in the above-mentioned example, although the multiplication of 16 bit data has been explained, when the double precision operation is executed for a word length longer than the above (16 bits) by use of the single precision DSP, the processing cycles inevitably increase markedly.

Consequently, when the double precision operations are executed frequently by use of the single precision DSP, there exists a problem in that the double precision operation takes a long time, so that the high speed operation is inevitably limited to some extent.

Therefore, in the case where processing including many high precision operations is executed, the double precision DSP for enabling a high speed processing is often used, as compared with when the double precision operation is executed by the single precision DSP as described above. When the double precision DSP is used, the memory capacity, the signal line capacity, etc. are extended within the DSP, as compared with the case of the single precision DSP. In addition, the circuit scale of external peripheral circuits of the DSP are extended in accordance with the double precision specifications, in comparison with the single precision DSP. In particular, the total element including the DSP and the peripheral circuits (other than the DSP) are large-sized. In addition, the power consumed by the peripheral circuits also increases, as compared with that of the total element including the single precision DSP and the peripheral circuits.

When the double precision DSP is used, since the number of bits of the arithmetic data can be extended, high precision operation can be executed. However, when the single precision operation (which do not require a high precision) is executed by use of the double precision DSP, since the high- or lower-order bits of the arithmetic data must be changed to "0" or "1", the double precision specifications of not only the double precision DSP body but also the peripheral circuits are wasted. Further, the power consumption of the peripheral circuits are also wasteful.

As described above, in the arithmetic data processing, there are two cases where the high precision operation is essential and where high speed operation is required rather than the operation precision. In the conventional DSP, however, when the single precision operation is executed by the processor constructed by the double-precision DSP, there exist problems in that the double precision specifications of the DSP and the peripheral circuits are wasted and further the power consumption thereof is also wasteful.

SUMMARY OF THE INVENTION

With these problems in mind, therefore, it is the object of the present invention to provide a digital arithmetic integrated circuit or a digital signal processor which can execute high precision operation at high speed.

To achieve the above-mentioned object, the present invention provides a digital arithmetic integrated circuit, comprising: an arithmetic data storing memory for storing arithmetic data and for outputting, in one instruction cycle, first and second arithmetic data strings each composed of a plurality of bits, the first arithmetic data string being composed of m-bits of at least a predetermined unit word length and the second arithmetic data string being composed of (m×n)-bits n-times longer than that m-bits of the unit word length of the first arithmetic data string; two arithmetic operand storing registers for storing the first and second arithmetic data strings outputted by said arithmetic data storing memory, respectively; an arithmetic logical unit for executing arithmetic operation on the basis of the two operands outputted by said arithmetic operand storing registers in one instruction cycle; and an arithmetic result storing register for storing the arithmetic results outputted by said arithmetic logical unit.

DETAILED DESCRIPTION OF THE PREFERRED EMBODIMENTS

Figure 1:
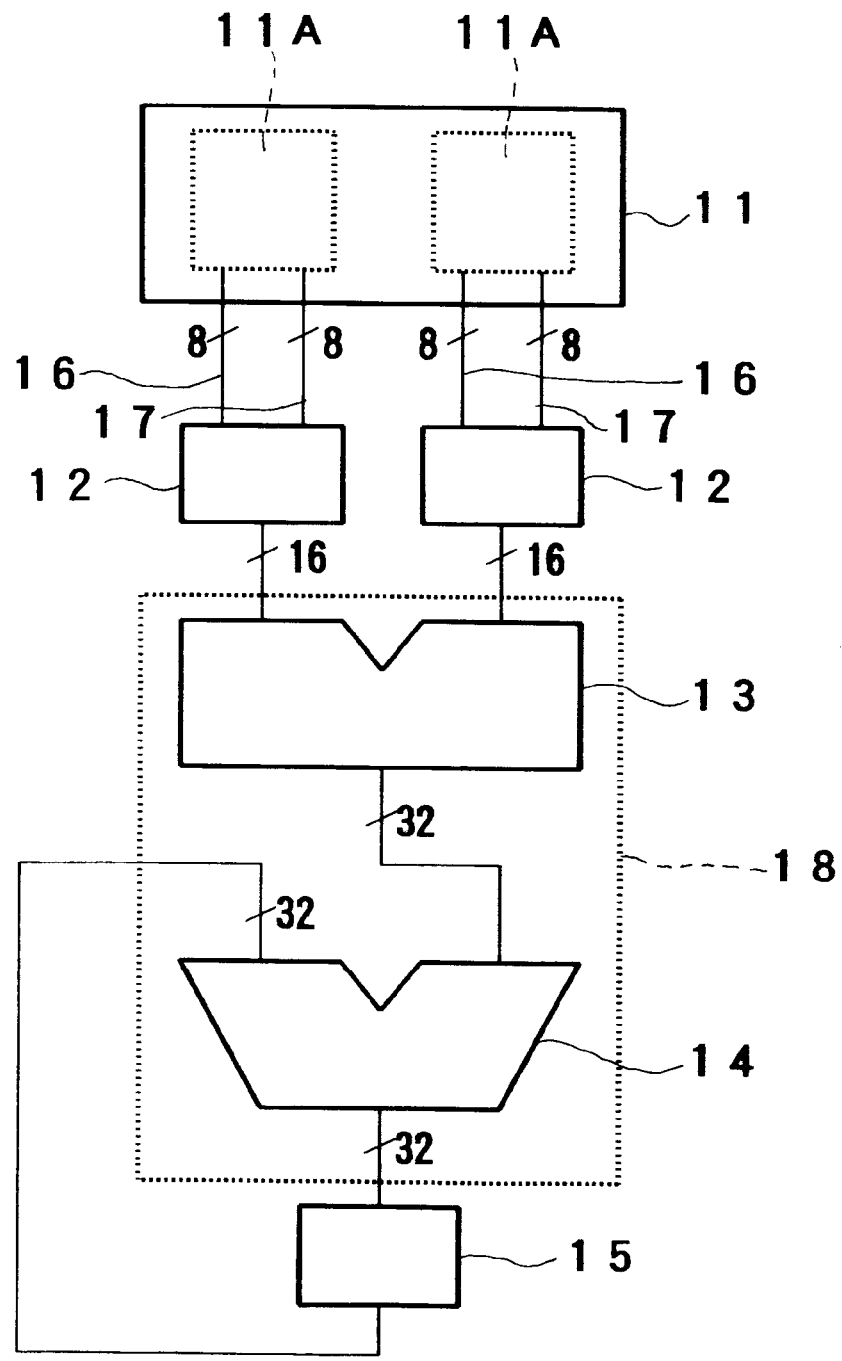
FIG. 1 is a schematic block diagram showing a first embodiment of the digital signal processor or the digital arithmetic integrated circuit according to the present invention.

Some embodiments of the present invention will be described hereinbelow with reference to the attached drawings. FIG. 1 shows a first embodiment of the digital signal processor (DSP) or the digital arithmetic integrated circuit according to the present invention.

In FIG. 1, the DSP is roughly composed of an arithmetic data storing memory 11 for storing and outputting arithmetic data (referred to as data, simply), two arithmetic operand registers 12 each for storing an arithmetic operand, a parallel multiplier 13, an arithmetic logical unit 14, and an arithmetic result register 15 for storing arithmetic results obtained by the parallel multiplier 13 and the arithmetic logical unit 14.

Figure 2:
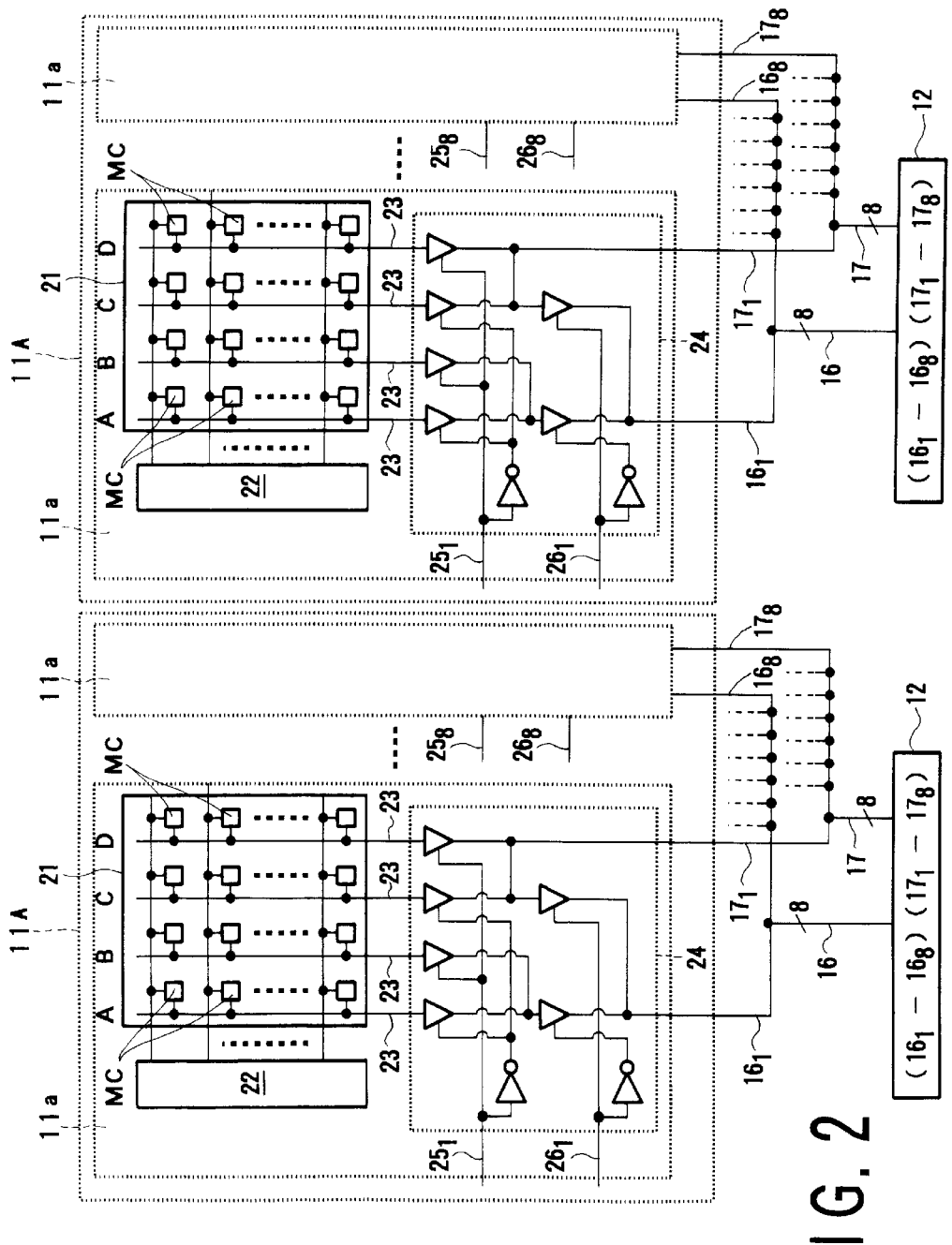
FIG. 2 is a schematic block diagram showing a part of the first embodiment of the digital signal processor (DSP) according to the present invention shown in FIG. 1.

Further, the above-mentioned arithmetic data storing memory 11 is composed of two units 11A, and these two units 11A output a first output signal 16 and a second output signal 17, respectively. In more detail, the first output signal 16 is 8-bit data outputted by one of the two units 11A of the arithmetic data storing memory 11 to one of the two arithmetic operand registers 12, and the second output signal 17 is also 8-bit data outputted by the other of the two units 11A of the same memory 11 to the other of the two arithmetic operand registers 12. Further, the parallel multipliers 13 and the arithmetic logical unit 14 are sometimes constructed together as a single unit, which is referred as an accumulative adder 18. Here, the DSP according to the present invention shown in FIG. 1 is different from the prior art DSP shown in FIG. 7 in that the second output signal 17 is additionally outputted by each of the units 11A of the arithmetic data storing memory 11 to each of the two arithmetic operand registers 12. As shown in FIG. 2, each of the two units 11A is composed of eight data circuits 11a. Further, each of the eight data circuits 11a is composed of a memory cell (MC) array 21, a row decoder 22, and a column selector 24. To the selector 24, two address signals 25i and 26i are inputted, respectively as shown.

The features of the circuit and the operation of the DSP according to the present invention will be described in more practical way hereinbelow with reference to FIG. 2.

Figure 7:
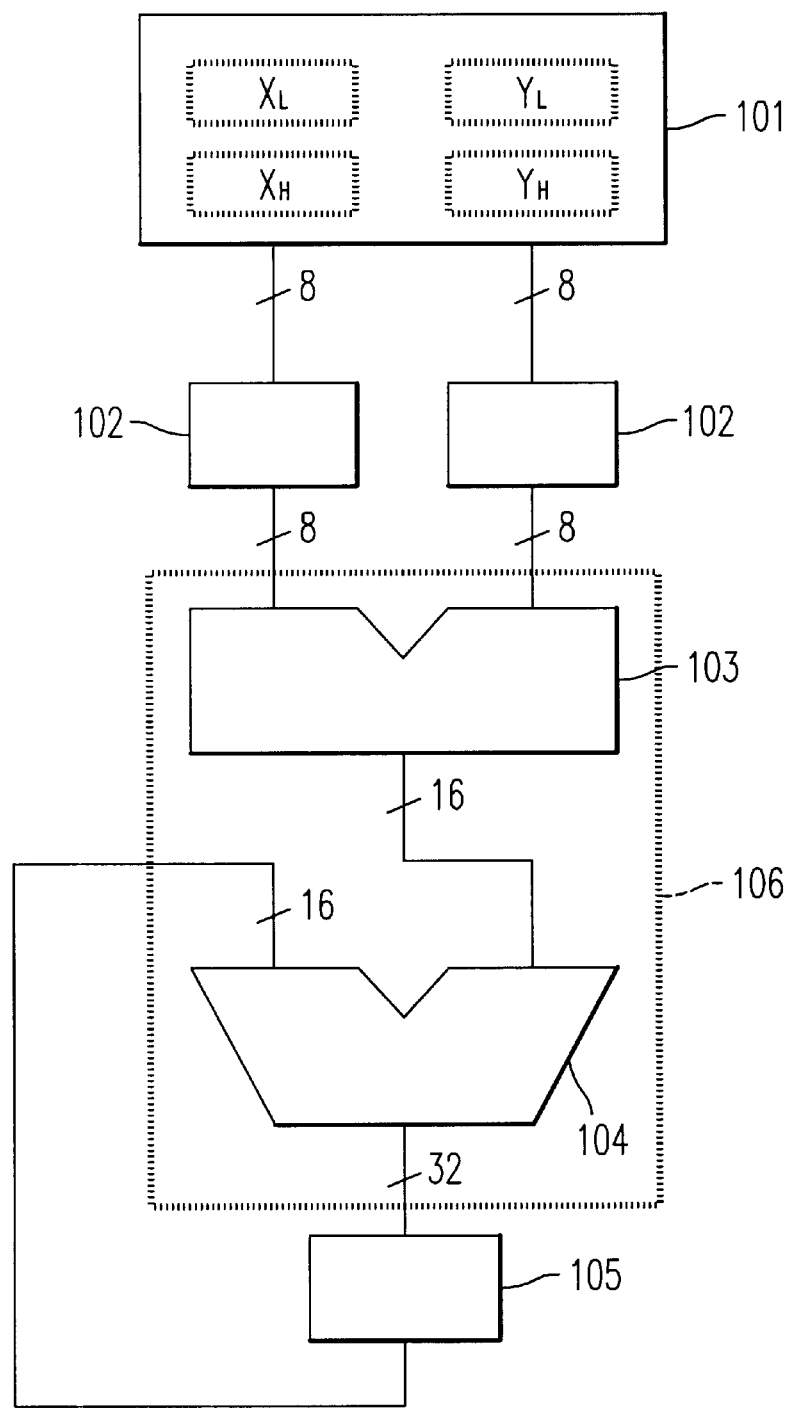
FIG. 7 is a schematic block diagram showing a prior art digital signal processor (DSP)
Figure 8:
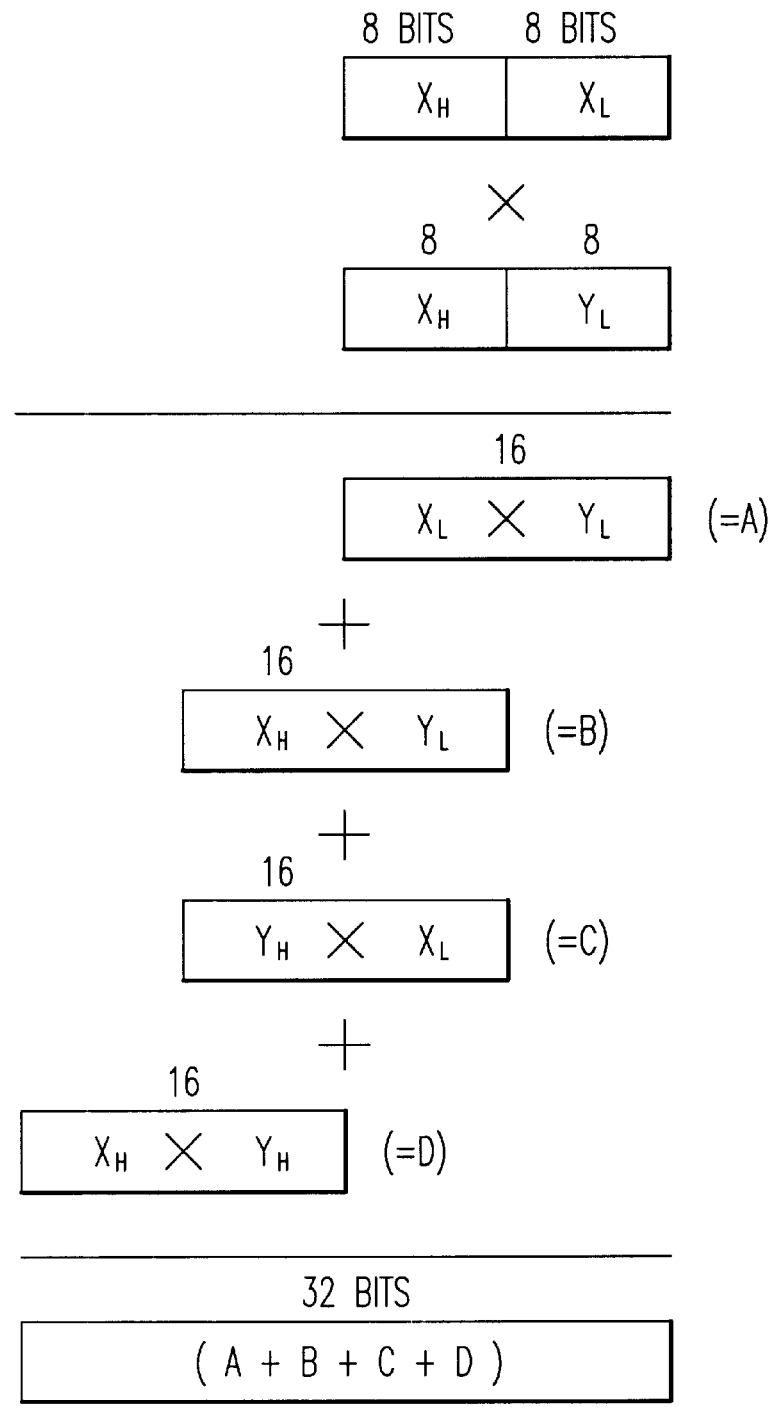
FIG. 8 is an illustration for assistance in explaining a method of the prior art digital signal processor (DSP) shown in FIG. 7.

The output signals of the memory cell array 21 are transmitted from the memory cells MC of the memory cell array 21 selected by the row address decoder 22 to the column selector 24 through column bit lines 23, in the same way as with the case of the prior art DSP as shown in FIG. 7. Here, each bit line 23 is arranged for each column of the memory cell array 21. Each of the column selectors 24 arranged in the arithmetic data storing memory 11 is provided with such a function as to select the arithmetic data for one column outputted from the memory cell array 21 on the basis of a plurality (e.g., two) of address signals 25i and 26i. The arithmetic data transmitted to the column selector 24 are outputted, as data output signals 16i and 17i, on the basis of the address signals 25i and 26i controlled on the basis of the column addresses in the column selector 24.

In the present invention, in addition to the data signal 16i for one column (referred to as the first data output signal) (which is the same as with the case of the prior art DSP), the other data signal 17i for one column (referred to as the second data output signal) are outputted as the arithmetic data by each of the data circuits 11a of each unit 11A of the arithmetic data memory 11. Therefore, it is possible to transmit arithmetic data for two columns to the arithmetic operand registers 12 in one instruction cycle.

Further, in the DSP according to the present invention, an address map and the column selector 24 of the arithmetic data storing memory 11 are constructed in such a way that the double precision data of two continuous column addresses can be outputted as the first and second data output signals 16i and 17i. As a result, since the first and second data output signals 16i and 17i can be transferred from the arithmetic data storing memory 11 to the arithmetic operand registers 12 in one instruction cycle, various processing such as the arithmetic operation of arithmetic data, the storage of the arithmetic results, etc. can be all executed in one instruction cycle, in spite of the double precision arithmetic processing.

Here, since the first data output signals 16i transmitted from the column selector 24 are transmitted to a data bus in the same way as with the case of the prior art DSP, an output buffer having a large drive capability is required for the first data output signals 16. However, since the second data output signals 17i, are inputted to only the arithmetic operand registers 12, the output buffer having a large drive capability is unnecessary. Therefore, it is possible to realize the arithmetic data storing memory 11 in a size almost the same as with the case of the prior art memory size. In addition, when the circuit scale of the entire DSP is taken into account, although the arithmetic operand registers 12 and the arithmetic logical unit 14 must be extended to such an extent as to correspond to an increase of the word length of the arithmetic data for one instruction cycle, since it is unnecessary to change the sizes of the internal bus and the other registers of the DSP, an increase of the area occupied in the DSP is small from the standpoint of the entire LSI.

Here, a practical method of outputting arithmetic data at two continuous column addresses from the arithmetic data storing memory 11 to the arithmetic operand registers 12, as the first and second data output signals 16i and 17i, will be described hereinbelow in detail.

The addresses which correspond to each of the columns of the memory cell array 21 shown in FIG. 2 are denoted by A, B, C and D, respectively.

When a low-level (referred to as Lo) control signal is inputted as both the address signals 25i and 26i, arithmetic data at the column address A are outputted as the first data output signals 16i, and arithmetic data at the column address C are outputted as the second data output signals 17i. Further, when a high-level (referred to as Hi) control signal is inputted as the address signal 25i and the Lo control signal is inputted as the address signal 26i, arithmetic data at the column address B are outputted as the first data output signals 16i, and arithmetic data at the address D are outputted as the second data output signals 17i. Further, when the Lo control signal is inputted as the address signal 25i and the Hi control signal is inputted as the address signal 26i, arithmetic data at the column address C are outputted as both the first and second data output signals 16i and 17i. Further, when the Hi control signal is inputted as both the address signals 25i and 26i, arithmetic data at the column address D are outputted as both the first and second data output signals 16i and 16i.

At this time, when the arithmetic data are stored in the arithmetic data storing memory 11 in such a way that the high-order bit arithmetic data and the low-order bit arithmetic data (the double precision arithmetic data) can be outputted as data at two continuous column addresses A and C or B and D, it is possible to output the high-order bit data $X_{1H}$ as the first data output signals 16i and the low-order bit data $X_{1L}$ as the second data output signals 17i, respectively to the arithmetic operand registers 12 in one instruction cycle.

In the construction as described above, the high-order and low-order bit double-precision arithmetic data stored at the two continuous column addresses in the arithmetic data storing memory 11 can be transmitted from the arithmetic data storing memory 11 to the arithmetic operand registers 12 in one instruction cycle. Therefore, it is possible to execute various operation such as the arithmetic operation of the double-precision arithmetic data transmitted from the arithmetic operand registers 12 by the arithmetic logical unit 14, the storage of the double precision arithmetic results in the arithmetic result register 15, etc. in one instruction cycle through the pipeline processing. Therefore, it is possible to execute the data processing by the DSP at higher precision and at higher speed, as compared with the prior art DSP, without increasing both the area occupied in the LSI and the power consumption thereof.

Figure 5:
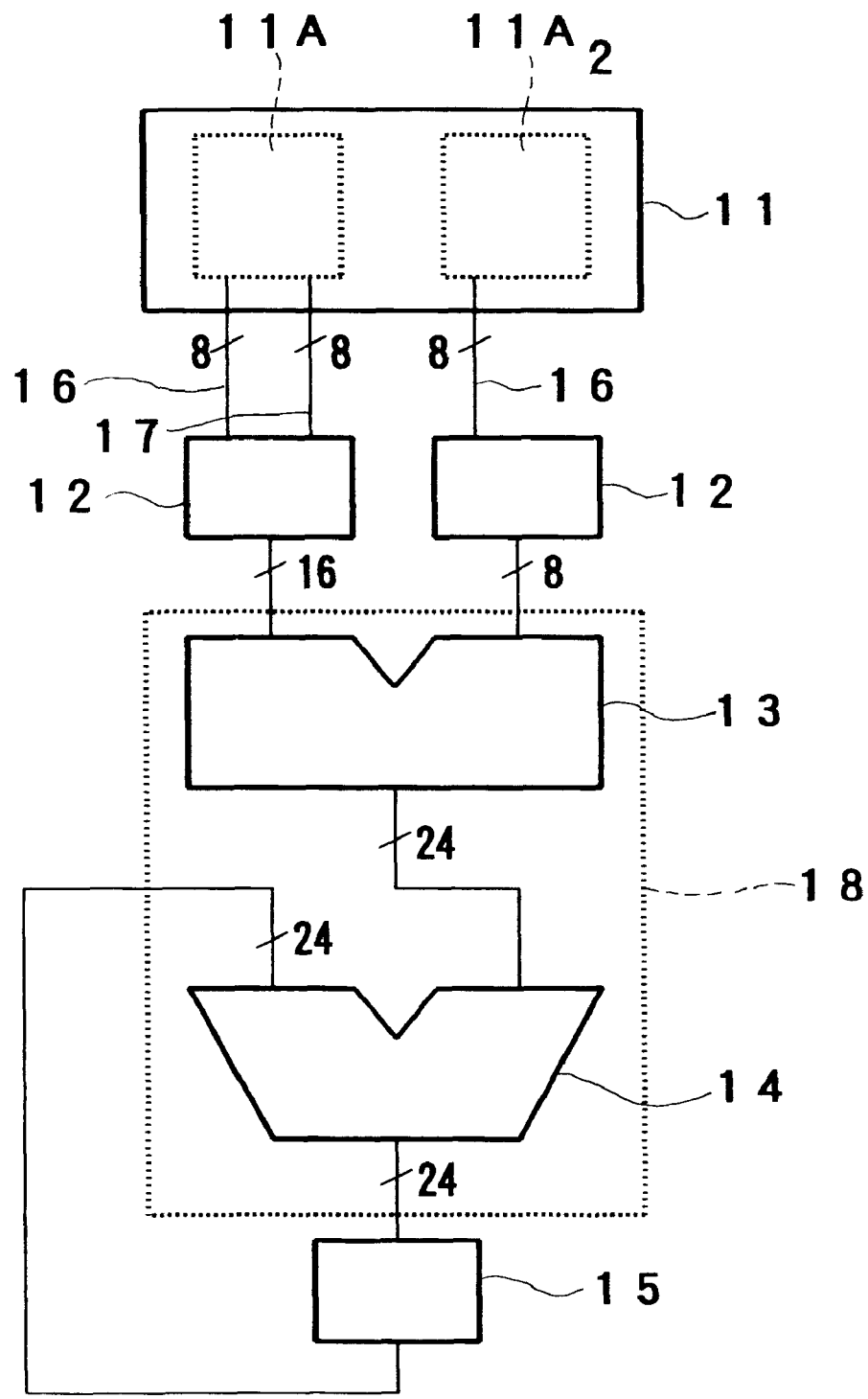
FIG. 5 is a schematic block diagram showing a modification of the first embodiment of the digital signal processor (DSP) according to the present invention.
Figure 6:
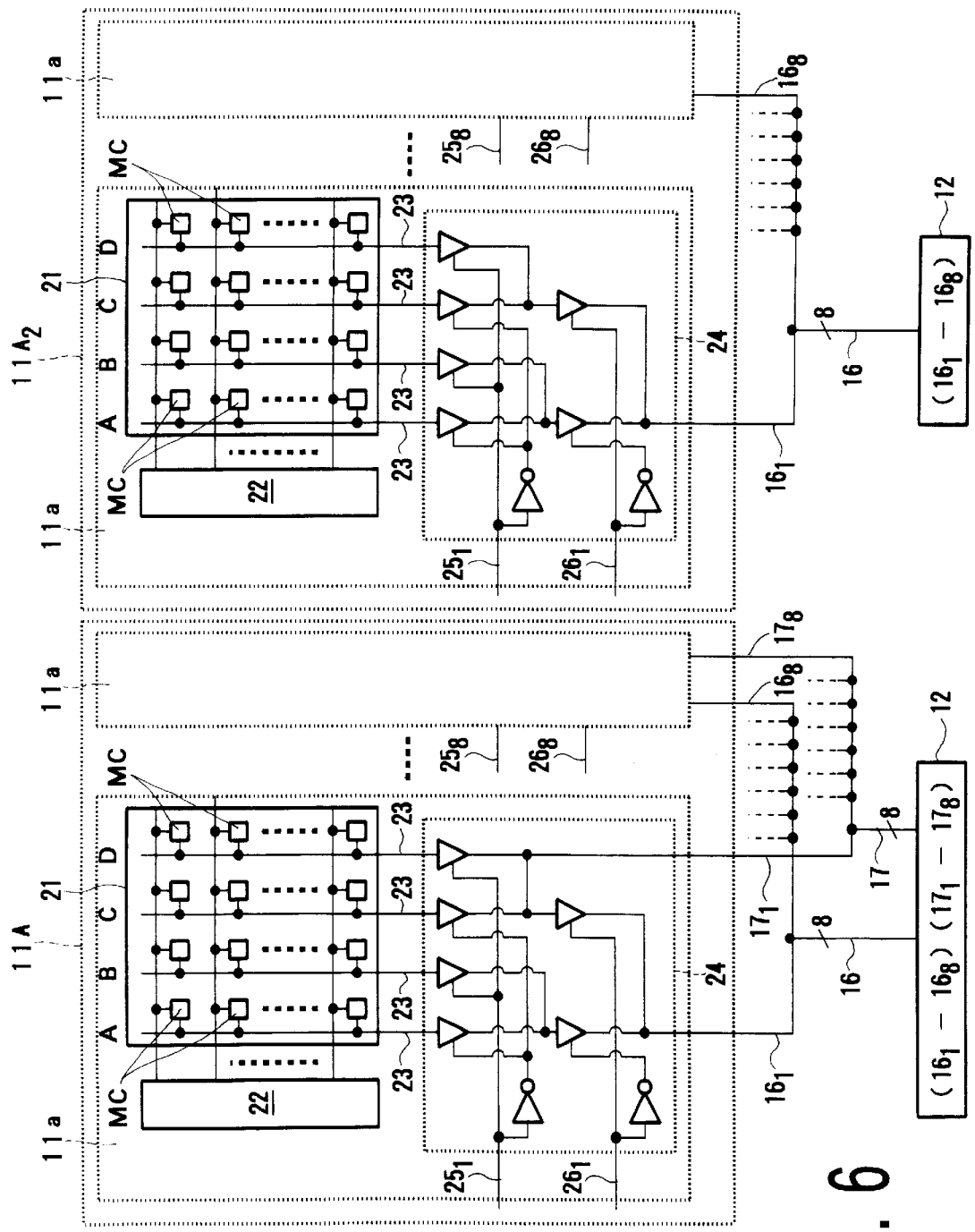
FIG. 6 is a schematic block diagram showing a part of the modification of the first embodiment shown in FIG. 5.

Further, it is also possible to construct the arithmetic data storing memory 11 in such a way that both the first and second data output signals 16 and 17 can be outputted by any one of the two units 11A, while only the first data output signal can be outputted by the other of the two units 11A, as shown in FIGS. 5 and 6.

A second embodiment of the present invention will be described hereinbelow with reference to FIG. 3. In this second embodiment, the DSP is provided with an additional function of changing either one of the first and second data output signals stored at the two continuous column addresses in the memory cell section and transmitted by the column selector, that is, either one of the high- or low-order bits of the arithmetic data to "0" or "1", as compared with the first embodiment shown in FIGS. 1 and 2. Therefore, it is possible to execute the single precision operation on the basis of only the high- or low-order 16-bit (for instance) arithmetic data of all the arithmetic data outputted by the arithmetic data storing memory.

Figure 3:
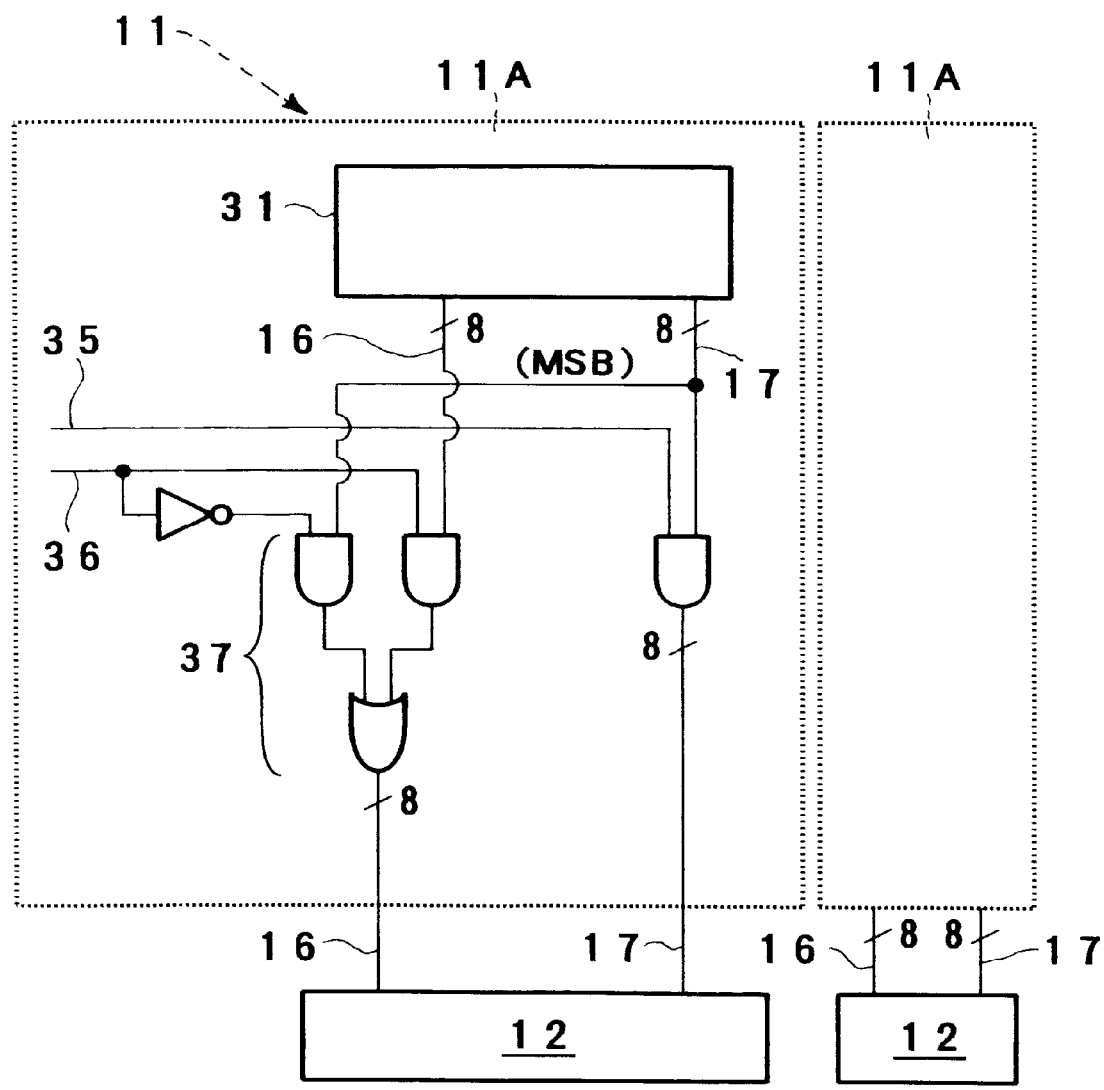
FIG. 3 is a schematic block diagram showing a second embodiment of the digital signal processor (DSP) according to the present invention.

The above-mentioned function can be realized by a circuit as shown in FIG. 3, in which each unit 11A is composed of an arithmetic data storing memory 31, an arithmetic operand register 12, etc. The circuit construction as shown in FIG. 3 has a function [3] for changing the high-order eight-bit arithmetic data (the first data output signal) 16 transmitted from the arithmetic data storing memory 31 to the arithmetic operand register 12 to the most significant bit of the low-order eight-bit arithmetic data 17, and another function [2] for changing the low-order bit arithmetic data (the second data output signal) 17 to "0" compulsorily.

The operation of the circuit shown in FIG. 3 will be described hereinbelow. When a Hi signal is inputted as two control signals 35 and 36, the high-order bit arithmetic data as the first data output signals 33 and the low-order bit arithmetic data as the second data output signals 34 are transmitted from the arithmetic data storing memory 31 to the arithmetic operand register 32, as they are, so that the double-precision operations can be executed. Further, when a Lo signal is inputted as the two control signals 35 and 36, the arithmetic data are kept unused. Further, when the Hi signal is inputted as the control signal 35 and the Lo signal is inputted as the control signal 36, the high-order bit arithmetic data as the first data output signals are outputted as the most significant bit data (MSB) of the low-order bit arithmetic data (i.e., L-code extension) by the function of a logical circuit 37. Further, the low-order bit arithmetic data as the second data output signals 34 are outputted to the arithmetic operand register 32, as they are. Further, when the Lo signal is inputted as the control signal 35 and the Hi signal is inputted as the control signal 36, although the high-order bit arithmetic data as the first data output signals 33 are outputted to the arithmetic operand register 32 as they are, the low-order bits arithmetic data as the second data output signals 34 are changed to 0. In summary, when the Hi signal is set to one of the two control signals 35 and 36 and the Lo signal is set to the other of the two control signals 35 and 36, it is possible to execute the single precision operation, by outputting the double precision arithmetic data from the arithmetic data storing memory 31 to the arithmetic operand register 32. The above-mentioned functions can be summarized as listed in Table below:

TABLE

| CASE | 35 | 36 | HIGH 8-BITS (16) | LOW 8-BITS (17) |
|---|---|---|---|---|
| [1] | $L_o$ | $L_o$ | (UNUSED) | (UNUSED) |
| [2] | $L_o$ | $H_i$ | (8 BITS) | 0 . . . 0 |
| [3] | $H_i$ | $L_o$ | S . . . S | ← S (7 BITS) |
| [4] | $H_i$ | $H_i$ | (8 BITS) | (8 BITS) |

In the above-mentioned second embodiment, the arithmetic data transmitted from the arithmetic data storing memory 31 to the arithmetic operand register 32 are manipulated. Without being limited only thereto, it is also possible to allow the arithmetic operand register 32 to have the above-mentioned functions. In more detail, the high-order bit arithmetic data and the low-order bit arithmetic data are transmitted from the arithmetic operand register 32 to the arithmetic logical unit 14 as two (first and second) data output signals. Further, the function for setting either one of the high- or low-order bit arithmetic data to 0 or 1is added to the arithmetic operand register 32. In this case, the single precision operation can be executed on the basis of only the high- or low-order 16-bit arithmetic data of the arithmetic data outputted from the arithmetic data storing memory. Further, in this case, since the 0- or 1-bit arithmetic data outputted to the arithmetic logical unit are held as they are by the arithmetic operand register without being erased thereby, the arithmetic data held by the arithmetic operand register can be used for the other arithmetic operation.

A third embodiment of the present invention will be described hereinbelow with reference to FIG. 4. In the third embodiment, instead of the arithmetic result storing register 15 of the first embodiment shown in FIG. 1, a register 42 for storing the high- and low-order bit arithmetic result data separately is provided. Therefore, when the single precision operation is executed by use of the double-precision arithmetic logical unit, the DSP can be so controlled that invalid arithmetic result data will not be stored in the arithmetic result storing register 42. In other words, since only the valid arithmetic result data can be stored in the arithmetic result register, it is possible to save the capacity of the arithmetic result register.

Figure 4:
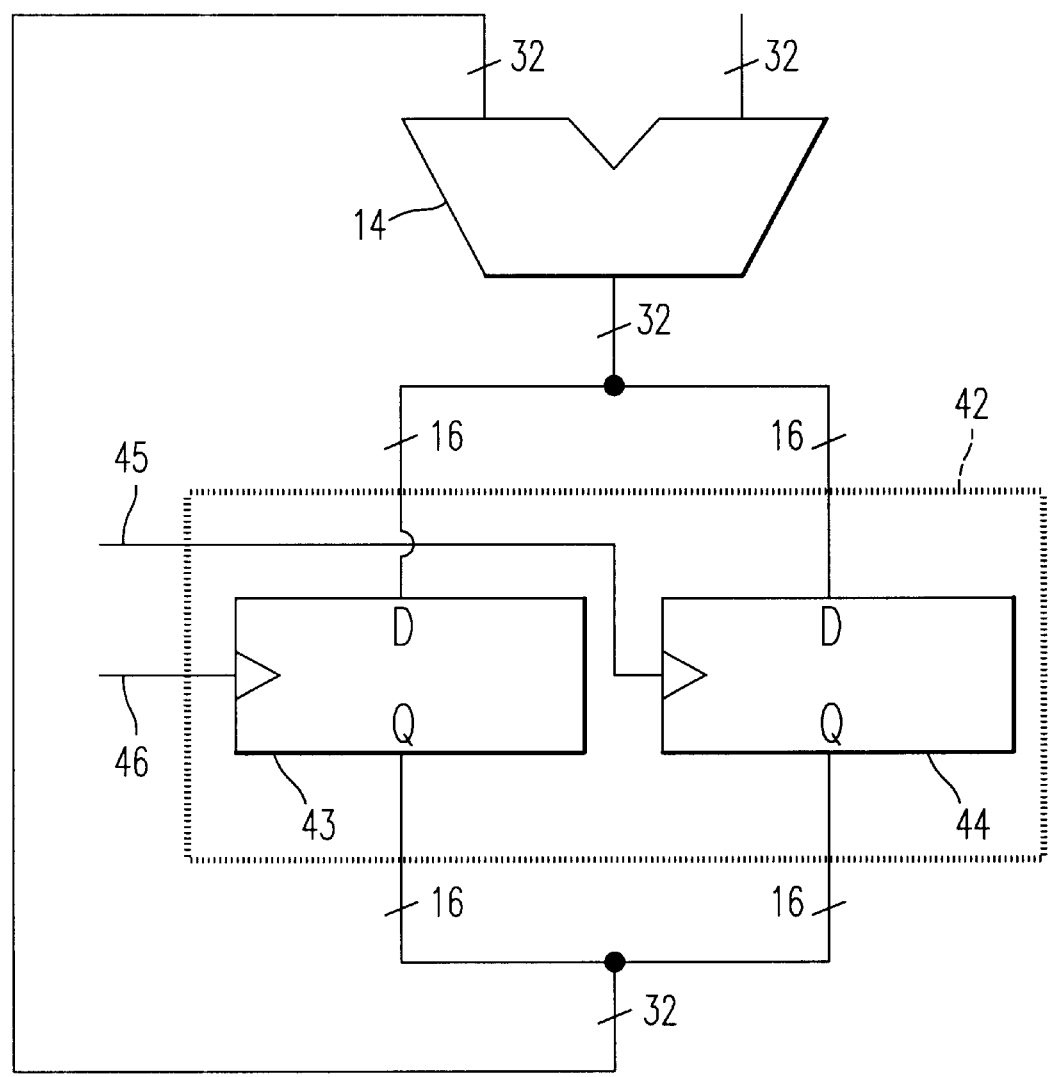
FIG. 4 is a schematic block diagram showing a third embodiment of the digital signal processor (DSP) according to the present invention.

The above-mentioned function can be realized by use of a circuit as shown in FIG. 4. The arithmetic result register 42 is composed of a high-order bit arithmetic result register 43 and a low-order bit arithmetic result register 44, respectively. These registers 43 and 44 are each composed of a D-type flip-flop, respectively. On the basis of the control of two control signals 45 and 46 inputted to the two registers 43 and 44, respectively, when the high-order 16-bit data of 32-bit data are invalid, each of the registers 43 and 44 has such a function as to store only the valid low-order 16-bit data.

In the above-mentioned first to third embodiments, the double-precision arithmetic operation of 32 bits composed of high- and low-order 16-bit data has been described by way of example. Without being limited only thereto, the multi-bit (more than 32 bits) arithmetic data can be operated in accordance with the above-mentioned method by modifying the constructions of the arithmetic data storing memory, the arithmetic operand register, etc. Further, as the arithmetic data storing memory, a ROM (read only memory), RAM (random access memory), another memory of dual port structure can be used. Further, the above-mentioned various registers can be constructed by a latch circuit, a flip-flop circuit, etc.

As described above, in the digital signal processor or the digital arithmetic integrated circuit according to the present invention, it is possible to transmit double-precision arithmetic data of high-order bits and low-order bits stored at two columns in the arithmetic data storing memory from the arithmetic data storing memory to the arithmetic operand registers in one instruction cycle. In addition, in accordance with the pipeline processing, it is possible to execute various operation such as the arithmetic operation of the double precision arithmetic data transmitted by the arithmetic operand registers by use of the arithmetic logical unit, the storage of the double precision arithmetic result data in the arithmetic result register, etc. all in one instruction cycle. As a result, it is possible to execute the data processing at higher speed and higher precision by use of the digital signal processor, without increasing the area occupied in an LSI and power consumption of the LSI.

What is claimed is:

1. A digital arithmetic integrated circuit, comprising:

an arithmetic data storing memory for storing arithmetic data and for outputting, in one instruction cycle, first and second arithmetic data strings each composed of a plurality of bits, the first arithmetic data string comprising m bits and the second arithmetic data string comprising m times n bits such that the second arithmetic data string is n-times longer than the first arithmetic data string;

first and second arithmetic operand storing registers for respectively storing the first and second arithmetic data strings output by said arithmetic data storing memory and for respectively outputting a first and second operand;

an arithmetic logic unit for executing an arithmetic operation on the basis of the first and second operands output by said first and second arithmetic operand storing registers and for outputting arithmetic results of the arithmetic operation, in one instruction cycle; and an arithmetic result storing register for storing the arithmetic results output by said arithmetic logic unit, wherein the arithmetic data storing memory comprises a first unit for outputting the first arithmetic data string and a second unit for outputting the second arithmetic data string, wherein the second unit includes m data circuits each having a memory cell array constructed by k bit lines and a selector for selecting in of the k-bit lines to output data through the selected bit lines.

2. The digital arithmetic integrated circuit of claim 1, wherein said digital arithmetic integrated circuit further comprises logical circuit means for switching values of the bits forming the second arithmetic data string to "0" or "1".

3. The digital arithmetic integrated circuit of claim 2, wherein said arithmetic result storing register comprises a plurality of independent registers each for separating the arithmetic results into a plurality of data strings for each word length and further for storing the respective separated data strings, separately.

4. The digital arithmetic integrated circuit of claim 3, which further comprises means for selectively stopping any of a plurality of the independent registers from outputting data.

5. The digital arithmetic integrated circuit of claim 4, wherein said arithmetic result storing register comprises a plurality of independent registers each for separating the arithmetic results into a plurality of data strings for each word length and further for storing the respective separated data strings, separately.

6. The digital arithmetic integrated circuit of claim 5, which further comprises means for selectively stopping any of a plurality of the independent registers from outputting data.

7. A digital arithmetic integrated circuit, comprising:

an arithmetic data storing memory for storing arithmetic data and for outputting, in one instruction cycle, first and second arithmetic data strings each composed of a plurality of bits, the first arithmetic data string comprising m bits and the second arithmetic data string comprising m times n bits such that the second arithmetic data string is n-times longer than the first arithmetic data string;

first and second arithmetic operand storing registers for respectively storing the first and second arithmetic data strings output by said arithmetic data storing memory and for respectively outputting a first and second operand;

an arithmetic logic unit for executing a arithmetic operation on the basis of the first and second operands output by said first and second arithmetic operand storing registers and for outputting arithmetic results of the arithmetic operation, in one instruction cycle; and an arithmetic result storing register for storing the arithmetic results output by said arithmetic logic unit, wherein the arithmetic data storing memory comprises a first unit for outputting the first arithmetic data string and a second unit for outputting the second arithmetic data string, wherein the second unit includes m data circuits each having a memory cell array constructed by k bit lines and a selector for selecting one of the k bit lines to output data through the selected bit line, and the second unit includes m data circuits each having a memory cell array constructed by k bit lines and a selector for selecting n of the k bit lines to output data through the selected bit lines.

8. The digital arithmetic integrated circuit of claim 7, wherein said arithmetic logic unit includes means for executing summing arithmetic operations of both single and double precision.

9. The digital arithmetic integrated circuit of claim 8, wherein said arithmetic result storing register comprises a plurality of independent registers each for separating the arithmetic results into a plurality of data strings for each word length and further for storing the respective separated data strings, separately.

10. The digital arithmetic integrated circuit of claim 9, which further comprises means for selectively stopping any of a plurality of the independent registers from outputting data.

11. The digital arithmetic integrated circuit of claim 7, wherein said arithmetic result storing register comprises a plurality of independent registers each for separating the arithmetic results into a plurality of data strings for each word length and further for storing the respective separated data strings, separately.

* * * * *